March 9, 1943.  E. F. GRETHER  2,313,434
HUMOUS PRODUCT
Original Filed May 10, 1939
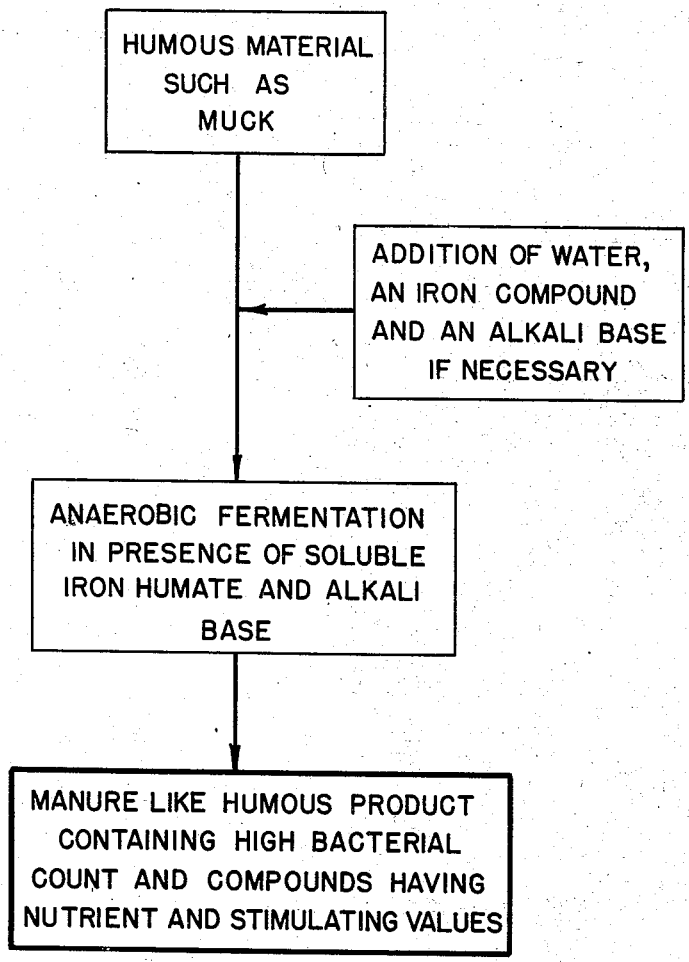
Inventor
ERNEST F. GRETHER
By Semmes Keegin & Semmes
Attorneys Patented Mar. 9, 1943

2,313,434

UNITED STATES PATENT OFFICE 2,313,434

HUMOUS PRODUCT

Ernest F. Grether, Midland, Mich., assignor to The Dow Chemical Company, Midland, Mich., a corporation of Michigan Continuation of application Serial No. 272,896, May 10, 1939. This application March 16, 1940, Serial No. 324,419

5 Claims. (Cl. 71—10)

My invention relates to a fermented humous material, and more especially to a humous material having manure-like properties. This application is a continuation of my co-pending application Serial No. 272,896, filed May 10, 1939.

It is well known that humous material, such as compost cellulosic material and naturally occurring humous material such as muck, is beneficial when applied to certain types of soil. This is principally due to the fact that the moisture absorbing properties of the humous material assists the soil in retaining its moisture content, thereby providing soil conditions in which bacteria beneficial to plant growth may multiply.

After application to the soil, this humous material also undergoes a slow decomposition which makes available to the growing plants some of the insoluble nitrogenous, proteinic and other compounds which have nutritive values. This decomposition is hastened if the soil is alkaline due to the presence of lime.

Hitherto, many attempts have been made to devise methods of treating these humous materials so as to convert the nutrient compounds which they contain into a plant available form before the humous material is applied to the soil. For example, in the autoclave process the humous material is superheated to cause the conversion of some of these compounds. Other methods have been devised in which the material is subjected to a fermentation which is usually of the aerobic or aerobic-anaerobic type. Various compounds are sometimes added either before or after fermentation to supply deficiencies in the plant available contents of the humous material and to produce a balanced fertilizer.

Although the desirability of producing a humous material having plant stimulating and fertilizing values is apparent, none of the above described methods have produced a product which has met with any degree of commercial success, and it is therefore obvious that these efforts to make available the plant nutrients contained in humous material have been wholly or partly unsuccessful. Moreover, none of the prior methods produce an end product having the manure-like properties and bacterial count which distinguish the applicant's product.

One of the objects of my invention is to provide a product having an increased bacterial count and a decreased number of types of bacteria as compared to the humous material from which it is derived.

Another object of my invention is to provide a humous product containing a plant stimulant.

Still another object of my invention is to provide a humous product containing soluble iron humates and soluble alkali compounds.

Yet another object of my invention is to provide a humous product having many of the characteristics and containing many of the compounds present in manure.

A further object of my invention is to provide a humous product which is neutral or alkaline in character, has manure-like characteristics, a high bacterial count, and plant stimulating values over and above the effect that would normally be produced from the available plant food present.

With these and other objects in view, my invention embraces broadly the concept of providing a humous product having manure-like characteristics by subjecting a humous material to an anaerobic fermentation in the presence of an iron compound and an alkali base or a mixture of alkali bases. A sufficient quantity of alkali base is added to produce a hydrogen ion concentration of at least 7, and in the preferred form of my invention the hydrogen ion concentration of the mixture is controlled by the addition, if necessary, of additional quantities of the alkali base during fermentation. The desired anaerobic fermentation is secured by the addition of sufficient water to form a paste-like mass which will exclude the atmosphere, or by any other suitable method.

The starting material to produce my invention is a humous material, that is, a substance that has undergone a previous fermentation, such as peat muck, lignite, leaf mold, or composted cellulosic material such as decayed straw, as distinguished from raw cellulosic materials, such as corn stalks. While my product may be produced from any of the above mentioned types of humous material, for purposes of illustration I will disclose the product as it is produced when muck is used as a starting material and water is employed to promote the anaerobic fermentation.

Muck is a naturally occurring humous material which has undergone a previous fermentation, is usually acidic in character, and possesses a low bacterial count. However, either an acidic, neutral or alkaline muck may be used as a starting material in my process unless the alkalinity of the substance is due to the presence of compounds containing calcium, such as limestone or the alkaline earth metals. Mucks from many alkaline bogs owe their alkalinity to the presence of these compounds and cannot be utilized in my process for reasons which will be subsequently disclosed.

The single sheet of drawings discloses a flow sheet illustrative of one form of my invention.

In the illustrated method of producing the desired end product, a naturally occurring humous material, such as muck, is used as the starting material. In carrying out the process, a quantity of water, unless the selected material already contains sufficient water to be in the form of a paste, and, if necessary, an ionizable iron compound and an alkali base or a mixture of alkali bases are added to the selected humous material.

Preferably, I add the ionizable iron compound before the alkali base, although this order may be reversed if desired. If either the iron compound or alkali base is present in the starting material in sufficient quantities for the purposes of this process, additional amounts need not be added. The ionizable iron compound and base are preferably added in the form of aqueous solutions.

The quantity of water added varies with the moisture content of the original starting material and the amount of water added in the ionizable iron compound and the alkali base solutions. However, the resulting mixture, when these substances have been added, should have a sufficient moisture content to form a liquid paste-like mass. I have found that normally, in order to obtain this liquid paste-like form, the moisture content must be at least seventy percent by weight of the original humous starting material.

Among the various iron compounds which can be used may be mentioned ferric or ferrous hydroxide, ferric or ferrous sulfate, ferric chloride, ferrous ammonium sulfate, or a mixture of these or similar compounds, such as iron acetate, or citrate. The proportion of iron compound employed varies widely with the quantity of iron present in the original starting material and in the type of material selected. Muck usually contains a quantity of insoluble iron humate, and if sufficient of this or any other iron compound is present, no additional iron is necessary. In practice, when an average type muck is employed, the quantity of iron added varies between 0.05 and 0.5 gram atom of iron per kilogram of dry humous material. In order to enable the iron to be thoroughly mixed with the humous material, it is preferably added in the form of an aqueous solution. The concentration of solution used depends upon the physical condition of the starting material to which it is added.

After the iron compound has been added, a sufficient quantity of an alkali base, such as the hydroxides or carbonates of potassium, sodium, or ammonia, or a mixture of these bases, is added to the humous material to cause a hydrogen ion concentration in the resulting mixture of from 7 to 10, and preferably between 8 and 9. The proper regulation of this pH value is important as it results in a more complete conversion of the starting material.

Of course, if a sufficient quantity of these alkali bases is already present in the material, it will be unnecessary to add an additonal amount. The alkali base, if necessary, is preferably added in the form of an aqueous solution so that it may be readily mixed with the humous material.

The addition of the alkali base to the humous material causes the iron compound to be dissolved with the formation of a soluble humate iron within the mass. This novel reaction requires less alkali than the known method for preparing iron humate which comprises first preparing or separating the humic acid in purified condition, dissolving the acid in an aqueous alkali, and then adding a soluble iron salt, thereby causing the formation of iron humate and an inorganic salt by a double decomposition reaction. Moreover, by my method the iron humate is prepared without the simultaneous formation of a difficultly separable inorganic salt, such as is obtained in the double decomposition reaction. If an insoluble iron humate was present in the original starting material, the additon of the alkali converts this material into a soluble form.

The applicant has found that iron humate is soluble and stabilized only when an alkali is present. Moreover, the alkali apparently releases some of the compounds, such as protein, which are present in the humous material, thus making them available for bacterial food and thereby initiating a fermentation.

The alkali employed also reacts to form salts which are retained in the fertilizer product but which do not interfere with the iron humate. For this reason an alkali, such as the compounds of ammonia or potassium, which add food value to the product, is preferably employed, although the compounds of sodium may be employed if desired. The alkali earth metal hydroxides, particularly lime, cannot satisfactorily be used since they render humate iron insoluble and unavailable to plants.

The applicant has found that the presence of a sufficient quantity of iron humate and an alkali base are absolutely necessary in practicing his process. The presence of these compounds in soluble form is the determining factor in producing during the anaerobic fermentation, the large increase in bacteria and the resulting manure-like end product containing plant stimulants.

After a sufficient quantity of an alkali base has been added to the humous material to form the soluble iron humate and to produce a hydrogen ion concentration of from 7 to 10, the resulting mixture is subjected to an anaerobic fermentation of from a few days to three months duration at room temperature or at a temperature which is regulated at any desired point in a range between 20 and 40° C. In this connection the applicant has found that, if temperatures above 40° C. are employed, the desired increase in bacterial growth of the type desired cannot be obtained except with great difficulty, and that bacterial growth ceases above 50° C. An additional amount of the alkali base may be added from time to time during the fermentation, if necessary, to maintain the proper pH value.

By the term "anaerobic fermentation" in this application is meant a fermentation which is truly anaerobic as distinguished from the aerobic-anaerobic fermentations usually disclosed in the prior art. The most convenient way of producing true anaerobic conditions is to reduce the humous material to a paste-like mass which will practically exclude the penetration of the atmosphere into the interior of the mixture during fermentation.

These conditions were sometimes present during the original fermentation of the cellulosic materials which form the humous material known as muck, although even muck situated on lake bottoms may decay under more or less aerobic conditions since air can penetrate into water, while the penetration of the liquid paste-like form of the material in my process is much more limited due to the consistency of the material. This type of fermentation is entirely different from a fermentation of a humous material having a lower moisture content.

While the reduction of the humous material to a paste is a practical method of conducting the fermentation, it is obvious that other means of excluding the atmosphere during the fermentation could be devised. Such means would come within the scope of this invention.

The applicant has not been able to ascertain the exact type of bacteria which is developed in his process, although it is apparently not of a nitrifying type. The humous material is self-inoculated by bacteria in the air, which is believed to be a soil type of bacteria. Of course, many types of bacteria are present at first, but the condition of the humous material produced by the process is such that the desired type or types of bacteria multiply at the expense of those not desirable, and therefore the desired end product is obtained.

During the fermentation, the bacteria increases enormously. In some cases, for instance, the applicant has observed an increase approximately forty-fold during the fermentation, the fermented product containing about 600,000,000 per gram of the dry humous starting material employed in making the same. This large increase in bacterial count is due to the presence of the soluble iron humate, the particular type of fermentation, and the conditions under which it is employed. In addition to having a beneficial effect upon growing plants, the increased bacterial count and the presence of the soluble iron humate during the anaerobic fermentation results in an end product having a distinct manure-like odor.

In this connection, the applicant has found that, while the bacterial count reaches a peak during the first week of the fermentation, the manure-like odor is usually more pronounced after a fermentation of three weeks. Moreover, the material is at least as active if the fermentation is continued for from two to three months.

The bacterial action breaks up the organic material, especially the nitrogenous materials, and converts them into products of a nature similar to that produced by intestinal digestion and the following manure fermentation. The manure-like odor is characteristic of the fermentation and is entirely unlike the putrefactive odor usually associated with the fermentation of organic materials in the presence of oxygen. On the contrary, it resembles the odor of manure, especially stored liquid manure.

This odor is the result of the presence of ammonium sulfide, skatole and indole derivatives, such as are found in manure. The odor suggests that the fermentation causes a reaction in which the cystine radical is split from the molecule of the proteinic material which forms a part of the contents of the humous material. This reaction reduces the sulfur to hydrogen sulfide and causes a corresponding oxidation of other ingredients. The hydrogen sulfide reacts with ammonia to form ammonium sulfide. As cystine is toxic to plants, this reaction is beneficial. When this reaction of one part of the molecule occurs, it is believed that other parts of the molecule are broken up into amines, amino acids and amino alcohols. It is probable that the bacteria use these compounds partly for food and aid in converting other ingredients into other forms.

This bacterial action in the presence of soluble iron humate produces the stimulant content of the processed material. That such stimulants are present is indicated in part by the effect of the end product of the process on growing plants. This effect is very similar to that produced by rotted manure. The end product is a fertilizer because it contains plant food constituents. It also contains a plant stimulant because its growing action on plants is in excess of the food content. The bacteria contained in this humous end product is believed to be partly responsible for this plant stimulant action, because their presence renders soil minerals more available, but it is also believed that the stimulating substances which are released from the nitrogenous, proteinic, or other materials, through their action increases the appetite of the plant. This action results in a larger consumption of mineral elements and carbon dioxide by the plants.

In this connection it should also be noted that, when the end product of the process is subjected to heat for some time and cooled and then extracted with ether, the ether extract contains methyl butyric acid. Methyl butyric acid is also obtained when auxin is decomposed. Auxin, hetero-auxin and skatole can be obtained from manure and therefore my end product must contain these ingredients or similar ones which have a stimulating action on plants.

The product produced by the fermentation is a dark brown paste which may be stored safely or applied directly to the soil. Applications of this material have been found to increase the growth and yield of plants and cause early maturing. Moreover, the sugar, protein and vitamin contents of the plants appear to be increased. When fruits, such as strawberries, are grown, the taste is improved. The product contains from 30 to 40 percent by weight of dry material and is usually neutral or alkaline in reaction. If the material is to be used on soil of basic reaction, the pH concentration of this material may be reduced by adding an acid mineral fertilizer. A marked increase in the number of bacteria and a decrease in the types of bacteria are very noticeable upon microscopic examination.

If desired, this end product may be mixed with a filler, such as disclosed in my co-pending application Serial No. 204,475, which was filed April 26, 1938. Preferably, this filler is a dried portion of some of the humous material which was employed as a starting material in the process. However, if desired, a material such as dried peat, bran or other cellulosic material having water absorption powers may be used. Sufficient dry material is added to provide an end product having a dry content of from 60 to 80 percent by weight. There is no danger of destroying the abundant bacterial life by following this procedure which might result if an attempt were made to dry the product by ordinary methods. The resulting product is somewhat porous and has a tendency to crumble as distinguished from the imporous, heavy and dense untreated end product.

The following gives a specific example to illustrate one method of producing the end product which forms the basis of this invention, it being understood that other starting materials may be used and that the quantities and types of substances added to the starting material mentioned in the example may be varied. The length of fermentation depends upon the conditions present and the type of material which is selected as the starting material for the process.

Example I 1200 grams of peat was treated with a solution of 130 grams of potassium hydroxide in 3480 cubic centimeters of water, after which 80 grams of anhydrous ferric sulfate was added with stirring. The resultant mixture was a slightly acid paste-like mass comprising humate iron and potassium salts as well as nitrogen compounds initially present in the peat. It was neutralized with 15 cubic centimeters of 1 normal aqueous potassium hydroxide solution after which it was fermented by standing in moist condition at temperatures between 30° and 35° C. After standing under said condition for 3 days the product had developed a manure-like odor which became more intense on longer standing. The fermented product was highly effective as a fertilizer and plant stimulant.

If desired, 1200 grams of dried peat may be added to this material. If the moisture content of the resulting mass is still too high, it may be exposed to air drying until the moisture content is around 35 percent.

While for purposes of illustration I have described my novel composition prepared from one starting material and by one process, it is apparent that this product may be produced from other types of humous material and that the process may be adapted to this material. The material selected may be acidic, neutral, or alkaline in character, as previously mentioned, but cannot contain an appreciable amount of the alkaline earth metal hydroxides or other insoluble compounds containing the calcium ion.

None of the substances mentioned need be added to the process if they are already present in sufficient quantity in the original humous starting material, and all of the water may be added in the form of a solution containing the iron compound or the alkali base, or both, the sole limitation in the process being that an anaerobic fermentation of the type described be conducted in the presence of sufficient quantities of soluble iron humate and an alkali base or mixture of bases.

While I have described the manure-like characteristics of my novel composition, it is believed obvious that humous products containing essentially the same general characteristics may be produced without departing from the broad concept of this invention. I therefore intend that this application be only limited by the prior art and the scope of the appended claims.

I claim:

1. A new composition of matter comprising a heavy, dense, manure-like humous material in the form of a paste which contains approximately 70 percent by weight of water, said composition having been fermented under substantially anaerobic conditions in the presence of soluble iron humate and a sufficient amount of an alkali base to give the mixture a pH value of from 7 to 10 and which contains plant available nutrients and plant stimulants, a marked increase in the number of bacteria, and a marked decrease in the types of bacteria which were present in the original humous material.

2. A new composition of matter comprising a manure-like humous material in the form of a relatively porous material which contains from 20 to 40 percent water which has been formed by fermenting under substantially anaerobic conditions and in the presence of soluble iron humate and a sufficient amount of an alkali base to give the mixture a pH of from 7 to 10, a humous material in which sufficient water is present to form a paste-like mass, and then adding a sufficient quantity of dry cellulosic material to reduce this moisture content, said composition containing plant available nutrients and plant stimulants, a marked increase in the number of bacteria, and a marked decrease in the types of bacteria which were present in the original humous material.

3. A new composition of matter comprising a manure-like humous material in the form of a relatively porous material which contains from 20 to 40 percent water which has been formed by fermenting, under substantially anaerobic conditions and in the presence of soluble iron humate and a sufficient amount of an alkali base to give the mixture a pH of from 8 to 9, a humous material in which sufficient water is present to form a paste-like mass, and then adding a sufficient quantity of dry cellulosic material to reduce this moisture content, said composition containing plant available nutrients and plant stimulants, a marked increase in the number of bacteria, and a marked decrease in the type of bacteria which were present in the original humous material.

4. A composition comprising a heavy, dense, and substantially non-porous manure-like material having a pronounced manure-like odor, which manure-like material is prepared by the fermentation under substantially anaerobic conditions of humous material at temperatures between about 20° and about 40° C. in the presence of soluble iron humate in amount corresponding to at least 0.05 gram-atom of iron per kilogram dry weight of the humous material, and in the presence of sufficient alkali so that the pH value of the mixture is between 7 and 10, and sufficient water to form a thick paste of the mixture.

5. A composition comprising a heavy, dense and substantially non-porous manure-like product which when freshly prepared possesses a pronounced manure-like odor, and which product is prepared by the fermentation of humous material under substantially anaerobic conditions at about room temperature in the presence of soluble iron humate, sufficient alkali so that the pH value of the mixture is between 7 and 10 and sufficient water to form a thick paste of the mixture.

ERNEST F. GRETHER.